United States Patent
Baldwin

(10) Patent No.: US 10,582,186 B1
(45) Date of Patent: Mar. 3, 2020

(54) APPROACHES FOR IDENTIFYING MISALIGNED CAMERAS

(71) Applicant: Amazon Technologies, Inc., Reno, NV (US)

(72) Inventor: Leo Benedict Baldwin, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 972 days.

(21) Appl. No.: 14/302,264

(22) Filed: Jun. 11, 2014

(51) Int. Cl.
H04N 13/243 (2018.01)

(52) U.S. Cl.
CPC .................. *H04N 13/243* (2018.05)

(58) Field of Classification Search
None
See application file for complete search history.

(56) References Cited

U.S. PATENT DOCUMENTS

| | | | | |
|---|---|---|---|---|
| 9,609,305 | B1* | 3/2017 | Ramaswamy | H04N 13/246 |
| 2006/0215031 | A1* | 9/2006 | Krahnstoever | G06T 7/0018 348/187 |
| 2010/0225755 | A1* | 9/2010 | Tamaki | H04N 5/2254 348/78 |
| 2012/0257065 | A1* | 10/2012 | Velarde | H04N 5/2258 348/175 |
| 2012/0262607 | A1* | 10/2012 | Shimura | H04N 5/2258 348/239 |
| 2013/0120536 | A1* | 5/2013 | Song | H04N 13/00 348/46 |
| 2014/0009577 | A1* | 1/2014 | Wakabayashi | G01C 3/085 348/43 |
| 2014/0098197 | A1* | 4/2014 | Geris | H04N 13/0296 348/48 |
| 2014/0168377 | A1* | 6/2014 | Cluff | H04N 13/246 348/47 |
| 2014/0267633 | A1* | 9/2014 | Venkataraman | G01P 3/38 348/48 |
| 2015/0348580 | A1* | 12/2015 | van Hoff | G11B 19/20 348/38 |

OTHER PUBLICATIONS http://journal.info.unlp.edu.ar/journal/journal12/papers/jcst-oct04-4.pdf.
http://www.ptgrey.com/products/stereo.asp.
https://www.google.com/url?sa=t&rct=j&q=&esrc=s&source=web&cd=4&cad=rja&ved=0CEQQFjAD&url=http%3A%2F%2Fwww.di.ens.fr%2Fsierra%2Fpdfs%2Fcvpr08a.pdf&ei=CnlCU4-PLcv0oASB34LAAQ&usg=AFQjCNFhlZfpUVKr1ZN3h8UNv-MmPdTzow&sig2=bFGlT2uF_TyL6mMzTWmDNQ&bvm=bv.61535280.d.cGU.

* cited by examiner

*Primary Examiner* — Kaitlin A Retallick
(74) *Attorney, Agent, or Firm* — Polsinelli LLP

(57) ABSTRACT

An occurrence of an event triggering a dynamic recalibration of cameras in a computing device can be detected. In response, respective images of an object can be acquired using each of at least three cameras in the computing device at approximately a same time. Using at least three distinct pairs of the at least three cameras, a respective apparent distance between the computing device and the object can be determined. The respective apparent distances can be analyzed to isolate at least one misaligned camera.

12 Claims, 7 Drawing Sheets

US 10,582,186 B1

APPROACHES FOR IDENTIFYING MISALIGNED CAMERAS

BACKGROUND

People are increasingly interacting with computers and other electronic devices in new and interesting ways. For example, certain devices include stereoscopic cameras that are able to capture stereoscopic images that include disparity information, enabling those images to appear to be three-dimensional when properly rendered. In order for the relative distances of objects in the image to appear correctly, the cameras need to be adequately aligned such that the apparent disparity is accurate for the actual distance of the object, i.e., the optical axes are aligned in yaw, pitch, and roll. When using two distinct cameras, however, it is difficult to perfectly align the optical axes of the cameras, such that a software adjustment is also required. While a calibration procedure can be used during the manufacture or testing process, it may be difficult to get users to recalibrate the cameras over time. Further, over a period of time as the device is being used, the stereo cameras can get misaligned (due to shocks or natural degradation) or damaged.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to identifying misaligned, e.g., misaligned, cameras in a computing device that includes multiple cameras, e.g., three or more cameras. In particular, various embodiments enable the capture of three-dimensional (3D) or stereoscopic image data using stereoscopic pairs of cameras or camera sensors in the computing device. Each stereoscopic image can be evaluated to determine an object distance. Thus, for example, a computing device having four cameras can have at least four stereoscopic camera pairs. The respective object distances, as determined using the stereoscopic camera pairs, can be evaluated to isolate a misaligned camera in the computing device that is causing spurious distance measurements. Once identified, attempts to recalibrate the misaligned camera can be made. If the misaligned camera is unable to be corrected through recalibration, the camera can be labeled as defective and can no longer be used.

Various other applications, processes and uses are presented below with respect to the various embodiments.

Figure 1:
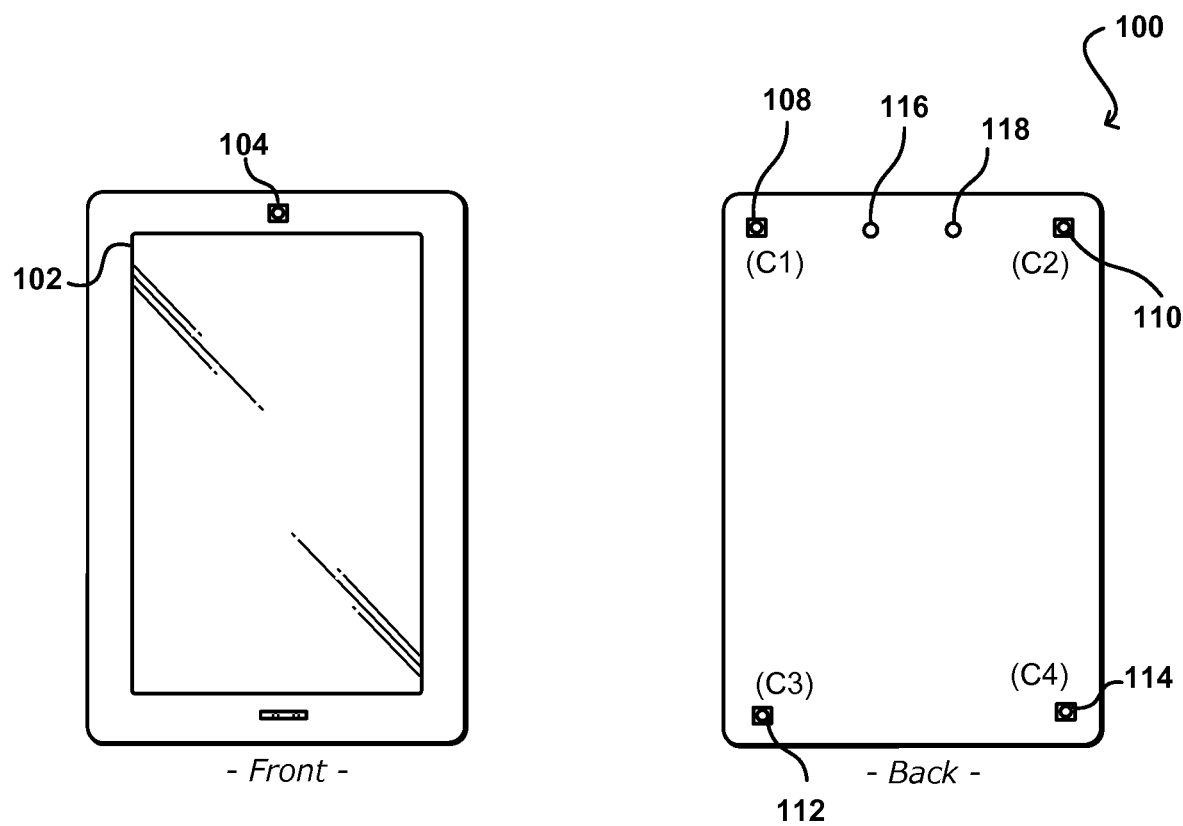
FIG. 1 illustrates front and back views of an example computing device including multiple cameras for imaging that can be utilized in accordance with various embodiments.

Electronic and computing devices can offer stereoscopic or three-dimensional (3D) imaging using one or more pairs of matched cameras. For example, FIG. 1 illustrates front and back views of an example electronic device 100 that can be utilized in accordance with various embodiments. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, notebook computers, personal data assistants, cellular phones, video gaming consoles or controllers, portable media players, wearable computers (e.g., smart watches or glasses), among others. The electronic device can utilize some of the same elements as a conventional device, such as may include a display screen 102 and at least one front-facing camera 104.

This example also includes four cameras 108, 110, 112, 114 arranged to provide at least four stereoscopic imaging pairs. These cameras are labeled C1, C2, C3, and C4 for reference, as used later herein. The cameras C1, C2, C3, and C4 can be paired to form a first camera pair C1 and C2, a second camera pair C2 and C4, a third camera pair C3 and C4, and a fourth camera pair C1 and C3. Other pairs are possible including, for example, a fifth camera pair C1 and C4 and a sixth camera pair C2 and C3. While shown on the backside of the device in this example, it should be understood that the pairs could be on the front of the device or in one or more other appropriate locations, such as on the sides, corners, edges, etc. of the device. The example device can include other elements useful for imaging as well, such as a light sensor 116 for determining an amount of ambient light and a white light LED 118, or other such illumination element, useful in illuminating objects within at least a portion of a field of view of at least one of the cameras 108, 110, 112, 114.

Each image capture element may be, for example, a camera, a complimentary metal-oxide semiconductor (CMOS) device, or another appropriate image capturing element or sensor. It should be understood that while certain elements are shown to be included on a "front" or "back" side of the device that any or all of these elements can be positioned on various sides, edges, faces, or other regions of such a device. Further, terms such as "front," "back," and "top" are used for purposes of explanation and are not intended to be interpreted as required orientations unless otherwise stated. Further still, while terms such as "rectangular grid" or "rectangular pattern" are used herein to describe the relative arrangements of various cameras, it should be understood that pairs of cameras in such a system are positioned along orthogonal axes, such as horizontal and vertical axes, such that a camera of a pair is positioned horizontally or vertically (or along other orthogonal axes)

with respect to another camera of the pair. It should be noted that the cameras do not have to form a proper rectangle, but can form other patterns such as a cross, set of parallel lines, points along a rectilinear grid, etc. Various other geometries and arrangements can be used as well within the scope of the various embodiments.

For any pair of these cameras that have at least a partially overlapping field of view, three-dimensional imaging can be performed by capturing image information for one or more objects from two different perspectives or points of view, and combining the information to produce a 3D image. In at least some embodiments, the fields of view can initially be matched through careful placement and calibration, such as by imaging using a known calibration standard and adjusting an optical axis of one or more cameras to have those axes be substantially parallel. In some embodiments, the cameras are assembled within an allowable manufacturing tolerance and the residual errors are determined by capturing images of a known calibration object and the residual errors corrected algorithmically as part of the stereo depth 3D calculations. As mentioned, three-dimensional or stereoscopic image information can be captured using multiple cameras to provide three-dimensional point data, or disparity information, that can be used to identify misaligned cameras. FIGS. 4A-C, 5, and 6A-B discuss ways in which disparity information can be obtained.

Figure 2:
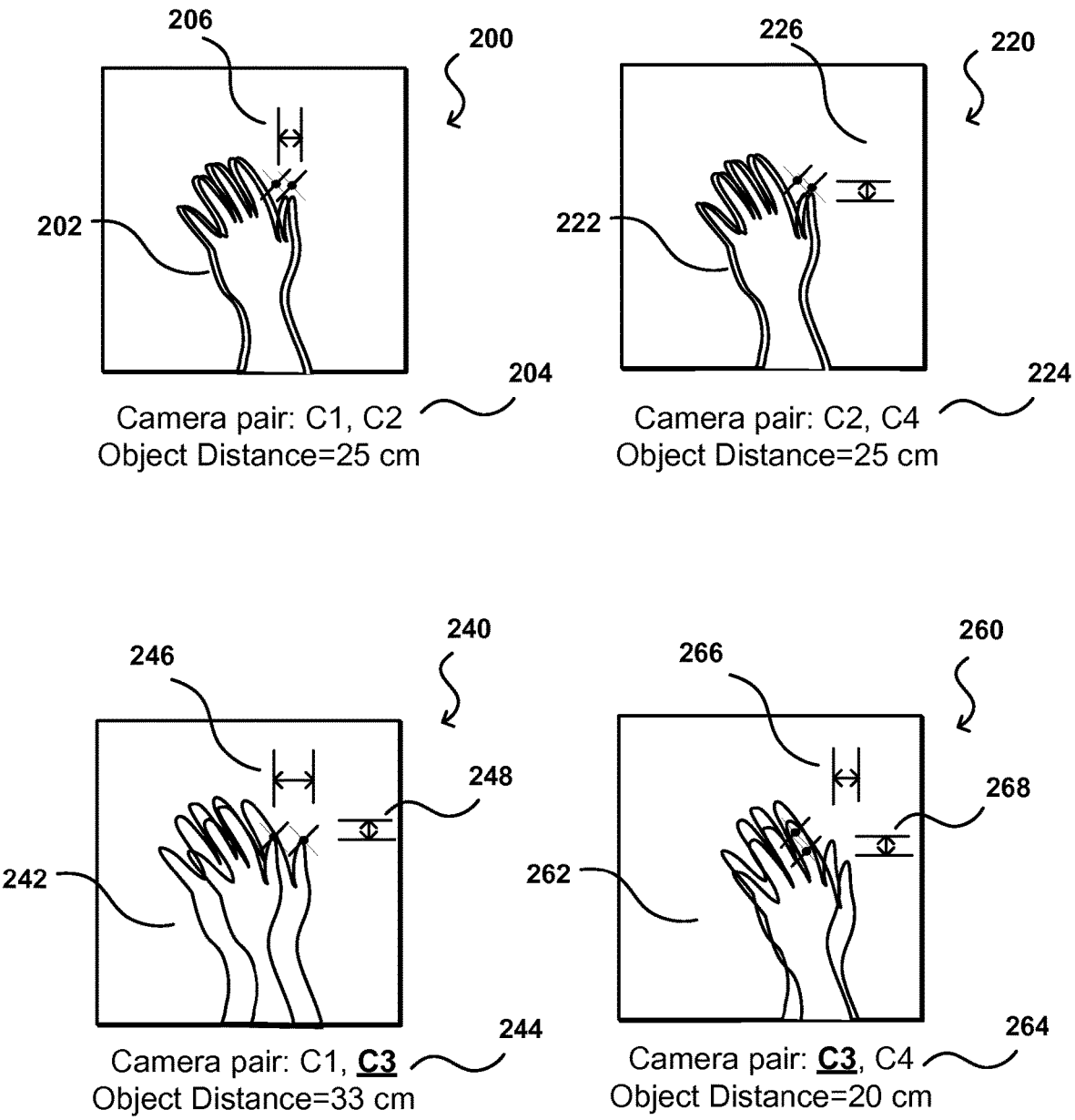
FIG. 2 illustrates example stereoscopic images captured by pairs of stereo cameras that can be used for identifying a misaligned camera in accordance with various embodiments.

FIG. 2 illustrates example stereoscopic images captured by pairs of stereo cameras that can be used for identifying a misaligned camera in accordance with various embodiments. For example, a computing device, e.g., the computing device 100, that includes four cameras, e.g., the cameras 108, 110, 112, and 114, each camera can capture an image of at least one object at approximately the same time.

Each of these four cameras can be positioned in a "rectangular grid" or "rectangular pattern" and can make up at least four stereo pairs. That is, cameras C1 and C2 can make a first pair, the cameras C2 and C4 can make a second pair, the cameras C3 and C4 can make a third pair, and the cameras C1 and C3 can make a fourth pair. This positioning is provided as an example. Depending on the implementation, cameras positioned diagonally from each other may also be paired for purposes of performing the approaches described in this specification. For example, cameras C1 and C4 can be paired, and cameras C2 and C3 can also be paired.

For each camera pair, a stereoscopic image of the at least one object can be determined using the images that were captured by each camera in the pair. A respective distance measurement for the at least one object can be determined using each stereoscopic image. Each distance measurement measures a distance between the camera pair in the computing device and the at least one object. These distance measurements can be compared to determine which distance measurements match and which do not. Ideally, if all four cameras are correctly aligned, then the distance measurements for each stereoscopic camera pair will match. However, over time, cameras in the computing device can become misaligned from their factory calibrated alignment, for example, as a result of the computing device being dropped or enduring wear and tear. As a result, the calibration parameters for the misaligned camera will generally no longer be valid for purposes of image rectification.

In various embodiments, the distance measurements of the at least one object for each camera pair can be evaluated to identify camera pairs for which the distance measurements do not match. The mismatching distance measurements can be used to isolate the misaligned camera that is causing the spurious distance measurements.

For example, consider the stereo image 200 represented in FIG. 2, which represents an overlay of images captured by a pair of stereo cameras offset horizontally, for example, the cameras C1 and C2, as described in reference to FIG. 1. The stereo image 200 includes a view of a hand 202. As can be seen, there is an expected amount of offset or disparity 206 due to the separation of the cameras along the horizontal axis (or x-axis). If the cameras are properly aligned, however, there will be no appreciable offset along the vertical axis (or y-axis). The disparity information for image 200 can be used to determine a distance measurement 204 for the hand 202. Thus, in this example, the stereo image 200 captured by the camera pair C1 and C2 is used to determine a distance measurement of 25 cm.

The stereo image 220 represents an overlay of images captured by a pair of stereo cameras offset vertically, for example, the cameras C2 and C4, as described in reference to FIG. 1. The stereo image 220 includes a view of a hand 222. As can be seen, there is an expected amount of offset or disparity 226 due to the separation of the cameras along the vertical axis (or y-axis). If the cameras are properly aligned, however, there will be no appreciable offset along the horizontal axis (or x-axis). The disparity information for image 220 can be used to determine a distance measurement 224 for the hand 222. Thus, in this example, the stereo image 220 captured by the camera pair C2 and C4 is used to determine a distance measurement of 25 cm.

The stereo image 240 represents an overlay of images from another pair of vertically offset cameras, for example, the cameras C1 and C3. In this example, there is an offset 248 along the y-axis, which can affect the apparent distance to that object from the computing device, as determined based on disparity information for the stereo image 240. This movement along the y-axis can be thought of as rotation along the x-axis, or "pitch" as it is often referred. Similarly, there is an offset 246 along the y-axis, due to misalignment of at least one of the cameras. This offset along the x-axis can be attributed to rotation along the y-axis, or "yaw." As previously stated, for vertically offset cameras such as cameras C1 and C3, there should be no appreciable offset along the x-axis. In this example, the disparity information for image 240 can be used to determine a distance measurement 244 for the hand 242. Thus, in this example, the stereo image 240 captured by the camera pair C1 and C3 is used to determine a distance measurement of 33 cm.

The stereo image 260 represents an overlay of images from another pair of horizontally offset cameras, for example, the cameras C3 and C4. In this example, however, there is additional offset 266 along the x-axis, which can affect the apparent distance to that object from the computing device, as determined based on disparity information for the stereo image 260. Similarly, there is an offset 268 along the y-axis, due to misalignment of at least one of the cameras. As previously stated, for horizontally offset cameras such as cameras C1 and C3, there should be no appreciable offset along the y-axis. In this example, the disparity information for image 260 can be used to determine a distance measurement 264 for the hand 262. Thus, in this example, the stereo image 260 captured by the camera pair C3 and C4 is used to determine a distance measurement of 20 cm.

Thus, in the example of FIG. 2, the distance measurement 204, i.e., 25 cm, as determined using cameras C1 and C2, matches the distance measurement 224, i.e., 25 cm, as determined using cameras C2 and C4. In contrast, neither the distance measurement 244, i.e., 33 cm, or the distance measurement 264, i.e., 20 cm, matches the distance measurements 204 and 224. The fact that the distance measurements 204 and 224 match is an indication that the cameras used in making those measurements, i.e., cameras C1, C2, and C4, are correctly aligned. Since neither of the distance measurements 244 and 264 match the distance measurements 204 and 224, a determination can be made that the two spurious measurements have one camera in common, i.e., camera C3. Based on this observation, a determination can be made that camera C3 is misaligned.

A similar approach can be applied to identify a misaligned camera in a computing device that has three cameras. In this device, a first camera C1 and a second camera C2 can be aligned along a first axis, e.g., horizontally offset, and the first camera C1 and a third camera C3 can be aligned along a second axis, e.g., vertically offset. These three cameras can make up at least three stereo pairs. That is, cameras C1 and C2 can make a first pair, the cameras C1 and C3 can make a second pair, and the cameras C2 and C3 can make a third pair.

Each camera can capture an image of at least one object at approximately the same time. For each camera pair, a stereoscopic image of the at least one object can be determined using the images that were captured by each camera in the pair. A respective distance measurement for the at least one object can be determined using each stereoscopic image. Each distance measurement measures a distance between the camera pair in the computing device and the at least one object. These distance measurements can be compared to a known distance of the at least one object. The distance of the at least one object can be predefined or can be determined mathematically using one or more models. Ideally, if all three cameras are correctly aligned, then the distance measurements for each stereoscopic camera pair will match, i.e., be within some threshold amount. In some embodiments, the known distance of an object is defined as being infinity. For example, in a computing device having three cameras, if distance measurements of an object from a first camera and a second camera agree that the object is distant from the computing device while measurements from the third camera indicate that the object is not distant, then the third camera can be identified as being faulty. Various corrective actions can then be taken with respect to the third camera, as described in this specification.

In various embodiments, the distance measurements of the at least one object for each camera pair can be evaluated with respect to the known distance of the at least one object. If one of the cameras is misaligned, that camera will produce two spurious distance measurements whereas the distance measurement determined by the other two cameras will correspond to the known distance of the at least one object. For example, if camera C3 is misaligned, then the distance measurement determined using the stereo pair C1 and C3 will be spurious and the distance measurement determined using the stereo pair C2 and C3 will also be spurious. However, if the distance measurement determined using the stereo pair C1 and C2 is correct, then a determination can be made that the camera C3 is misaligned. Once a camera has been isolated as being misaligned, various corrective measures, as described throughout this specification, can be performed.

In some embodiments, a camera can be identified as being misaligned based on a field of view overlap for cameras in each stereo pair. For example, assuming a computing device has three cameras, if the overlap threshold is set at 75 degrees, then the overlap between cameras in the pair C1 and C2 should be no less than 75 degrees. In a situation where the overlap between the camera pair C1 and C3 is less than 75 degrees and the overlap between the camera pair C2 and C3 is also less than 75 degrees, then a determination can be made that the camera C3 is misaligned, since it is the camera that is common in both spurious results.

Another approach for identifying a misaligned camera is based on the amount of time or processing needed for converging respective images that were captured by cameras in a stereo pair. Generally, convergence is the process of matching a set of features between the views of two stereoscopic cameras. For example, assuming a computing device has three cameras, if the amount of time or processing needed to converge images captured by the camera pair C1 and C3 is greater than a threshold value and the amount of time or processing needed to converge images captured by the camera pair C2 and C3 is also greater than the threshold value, then a determination can be made that the camera C3 is misaligned, since it is the camera that is common in both spurious results.

In some embodiments, once a camera is identified as being misaligned, various corrective actions can be taken to re-align that camera. For example, the computing device can attempt to recalibrate the misaligned camera. For example, the misaligned camera can be recalibrated by estimating or otherwise determining camera parameters for the camera and adjusting those camera parameters to compensate for any misalignment. For example, a transformation matrix M can be used to model the camera parameters for the camera, where the transformation matrix can be illustrated as:

$$\begin{pmatrix} u \\ v \\ 1 \end{pmatrix} = A[\ R\ \ T\ ] \begin{pmatrix} x_w \\ y_w \\ z_w \\ 1 \end{pmatrix}$$

In the transformation matrix referenced above, the camera parameters can be A, R, and T and can be representative of such camera parameters as focal length, principal points, lens distortions, as well as other intrinsic and/or non-linear camera parameters. Variables R and T can be representative of extrinsic camera parameters which can correspond to coordinate system transformation matrixes from three-dimensional (3D) space coordinates to 3D camera coordinates.

In some embodiments, these parameters are adjusted intelligently based on respective offsets corresponding to the stereo images, e.g., the images 200, 220, 240, and 260, that were captured by the camera pairs. For example, for cameras aligned along the x-axis, e.g., the camera pair C1 and C2 and the camera pair C3 and C4, the disparity between images captured by each camera and in the pair should exist only along the x-axis, and no disparity should exist along the y-axis. If there is disparity along the y-axis, then parameters can be adjusted to account for the offset along the y-axis. Similarly, for cameras aligned along the y-axis, e.g., the camera pair C1 and C3 and the camera pair C2 and C4, the disparity between images captured by each camera and in the pair should exist only along the y-axis, and no disparity should exist along the x-axis. If there is disparity along the x-axis, then parameters can be adjusted to account for the offset along the x-axis. After making these adjustments, the misaligned camera should no longer produce spurious results, e.g., spurious distance measurements. If making adjustments to the camera's calibration parameters are unsuccessful, i.e., the camera continues to produce spurious results, then a determination can be made that the camera is defective. In such instances, the defective camera can be excluded from being used in the future, for example, for determining disparity information. In some embodiments, a user operating the computing device can be alerted that the particular camera is defective and that corrective actions, e.g., repairs, are needed. In some embodiments, the user can be alerted by presenting a graphical indicator, e.g., arrow, pointing to the defective camera on a display screen of the computing device.

In some instances, adjustments to the parameters may result in the parameter satisfying a threshold value, or range, that is indicative of the camera being defective. Each parameter in the camera can have its own threshold value, or range, that is determined based on the manufacturing tolerances for the camera, as determined at the time of manufacture. Thus, for example, if an adjustment of 5 degrees is needed for one of the parameters, a determination can be made that this adjustment would result in the parameter meeting or exceeding a threshold tolerance of the camera. As a result, the camera can be labeled as being defective and appropriate actions can be taken, as described above. Another type of threshold value, or range, is based on a field of view overlap of respective images captured by cameras in a stereo pair. One example overlap threshold can be set at 75 degrees.

In some embodiments, these parameters are randomly adjusted until respective images captured by a camera pair and corrected by the modified rectification transforms come into congruence, i.e., the corrected camera is aligned and no longer produces spurious results, e.g., spurious distance measurements. For example, a small increment can be made to a camera's offset along the y-axis. Next, the camera can be tested using the adjusted parameters, for example, using dynamic rectification, to determine whether the camera produces results consistent with those of an aligned camera. If the camera produces worse results than the results prior to the adjustment, then the parameter can be adjusted in a direction opposite to the previous adjustment. This process can continue for all or at least some of the parameters that correspond to the camera until the camera beings to produce results consistent with those of an aligned camera or, if the camera continues to produce spurious results, the camera can be labeled as being defective. In some embodiments, this process is accomplished using various optimization methods, e.g., simulated annealing, as described below. Such optimization methods can be applied to correct misaligned cameras in computing devices that have three or more cameras.

For example, in a computing device having three cameras, if distance measurements of an object using the three cameras do not agree, it is generally not possible to isolate which of the three cameras is misaligned since each measurement determined using pairs of the cameras will involve the misaligned camera and thus will have a different measurement. In such instances, optimization methods can be used to randomly adjust various calibration parameters for one of the three cameras, determine new distance measurements for the object using the camera pairs, and then evaluate whether the new distance measurements agree. If the adjustment resulted in an improvement in the alignment of the camera, then the various calibration parameters can be adjusted further and additional distance measurements can be re-evaluated, as described above. If, as a result of the further adjustment, the alignment of the camera is now produces worse results, then the various calibration parameters can be adjusted in an opposite direction. Each calibration parameter can have a pre-determined boundary within which adjustments can be made. This process can be repeated for each camera and for each calibration parameter in an iterative manner until the distance measurements of the object, as determined using the three cameras, agree or until a camera is identified as being defective.

A camera that regularly needs recalibration may be loose and beyond repair. Thus, in some embodiments, if the parameters for the camera are in need of adjustment for a threshold number of times and within a threshold time period, then the camera can be labeled as being defective. For example, if, after making an adjustment, the camera operates correctly for only a few minutes and then another correction is needed, then a determination can be made that the camera is defective.

Depending on the embodiment, this process for identifying misaligned cameras can be performed when the computing device is first turned on or periodically at predetermined time intervals. In some embodiments, the process is performed when a determination is made that the computing device is stationary, for example, as determined using accelerometers and/or gyroscopes in the computing device, and that all of the cameras in the computing device are able to capture an image of a valid scene, for example, a scene having identifiable features, e.g., a user's face.

In some embodiments, the process is performed when a determination is made that the computing device has endured a high-G shock event, for example, as a result of the computing device being dropped. For example, the high-G event can be detected using accelerometers in the computing device.

Figure 3:
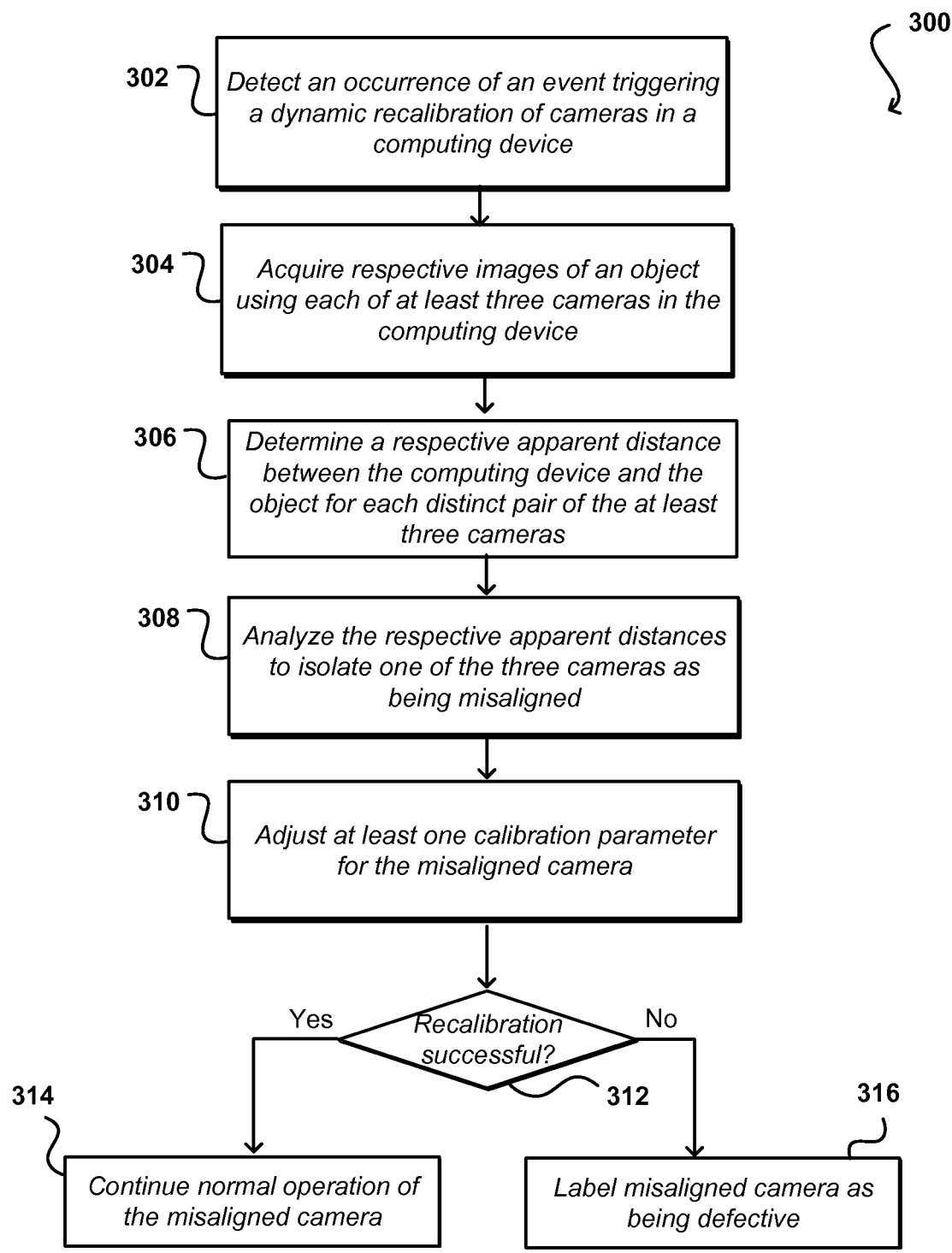
FIG. 3 illustrates an example process for identifying a misaligned camera in accordance with various embodiments.

FIG. 3 illustrates an example process 300 for identifying a misaligned camera in accordance with various embodiments. The example process 300 is provided merely as an example and additional or fewer steps may be performed in similar or alternative orders, or in parallel, within the scope of the various embodiments described in this specification.

In this example, an occurrence of an event triggering dynamic recalibration of cameras in a computing device is detected 302. For example, dynamic recalibration can be performed continuously, at predetermined time intervals, or upon the computing device powering on. In some embodiments, dynamic recalibration occurs in response to the computing device being stationary and the cameras in the device each having an unobstructed view of an object. Dynamic recalibration occurs in response to the computing device enduring a high impact, e.g., a high-G, event.

Next, respective images of an object can be acquired using each of at least three cameras in the computing device 304. These images are acquired concurrently or at approximately the same time. Respective apparent distances between the computing device and the object can be determined for each distinct pair of stereoscopic cameras from the at least three cameras 306. An apparent distance can be determined, for example, by analyzing, for each stereoscopic camera pair, a respective amount of disparity between a representation of the object in a first image captured by a first camera in the pair and a second image captured by a second camera in the pair. The amount of disparity relates to a difference in location of the object as represented in the first image and the second image.

The respective apparent distances for the at least three distinct pairs of the at least three cameras are analyzed to isolate one of the at least three cameras as being a misaligned camera 308. Once the misaligned camera has been identified, various corrective actions can be taken. For example, an amount and direction of a misalignment for the misaligned camera can be determined and calibration parameters for the misaligned cameras can be updated to correct the misalignment 310. For example, the direction of the misalignment can be along the x- or y-axis. The amount of the misalignment, e.g., offset, generally refers to a measurement of how misaligned the camera is along a particular axis.

After recalibration of the misaligned camera, the computing device can test the alignment of the at least three cameras to ensure that the realignment of the misaligned camera was successful 312. For example, this testing can involve capturing an image of an object using each camera at approximately the same time. The scene in each of the images can be compared among the images with respect to orientation and position of the scene. The level of similarity can be used to determine whether the realignment was successful. Further, images can be converged for each stereoscopic camera pair to determine whether the stereoscopic image is correct. In some embodiments, the testing involves repeating the process described above to determine whether the same camera is isolated as being misaligned.

If a determination is made that recalibration of the misaligned camera was successful, then the misaligned can continue operating normally 314. However, if a determination is made that the recalibration was unsuccessful, i.e., the camera continues to produce spurious results, then the misaligned camera can be labeled as being defective, and the computing device can be instructed to cease using the misaligned camera in future operations 316.

Figure 4A:
FIGS. 4A-C illustrate example stereoscopic image data that can be captured in accordance with various embodiments.
Figure 4B:
Figure 4C:

FIGS. 4A-C illustrate applying stereoscopic image data in accordance with various embodiments. For example, FIGS. 4A and 4B illustrate images 400 and 420 that can be captured using a pair of stereoscopic cameras that are in a computing device, e.g., the computing device 100. In various embodiments, a pair of cameras may capture images simultaneously or in close proximity to one another. As a result, the captured images would include at least some matching points of interest. For example, a user's finger, nose, eyes, eyebrows, lips, environmental features, or other features may be detected or tracked by the computing device in both images by using the various techniques discussed elsewhere herein. Since each image is captured using a camera at a slightly different location, the position of objects in each image will be different. As an example, if one were to overlay one of these images 400 and 420 on top of the other, as illustrated in the example image 440 of FIG. 4C, it can be seen that each of the objects is slightly offset, with objects closer to the camera being more offset than others, due to disparity differences as discussed previously. When displayed and/or viewed as a three dimensional image, however, the disparity causes the objects in the image to appear to be located at different depths.

FIG. 4C illustrates an example combination image 440 showing the relative position of various objects in the captured images 400 and 420 if those images were "overlaid" or "superimposed." This illustrates the amount of disparity, or lateral offset, between objects in the captured images. Objects in the images that are closer to the device, e.g., the finger, have relatively large amounts of disparity. Objects in the images that are further away from the device, e.g., the painting on the wall, have relatively small amounts of disparity. Objects in the images that are between these two areas will have intermediate amounts of disparity based upon the relative distance of those objects from the cameras.

Figure 5:
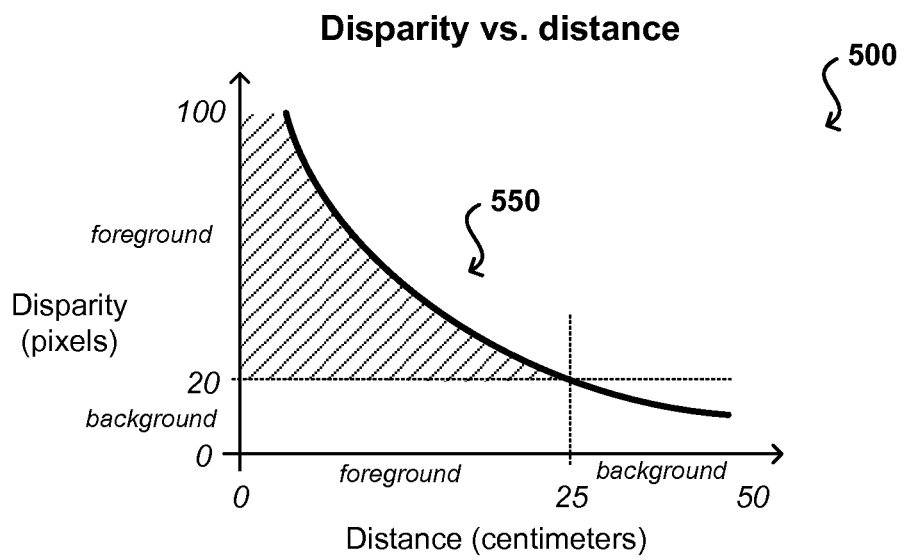
FIG. 5 illustrates an example plot showing a relationship of disparity with distance for an example stereoscopic imaging process that can be used in accordance with various embodiments.

FIG. 5 illustrates an example plot 500 showing a relationship of disparity with respect to distance. As illustrated, the amount of disparity is inversely proportional to the distance from the cameras, such that there can be significantly more disparity in the near camera field, e.g., 0 to 1.0 m, than in the far field, e.g., 1.0 m to infinity. Further, the decrease is not linear. However, disparity decreases more quickly near the device than at a distance, as objects in the distance can have little to no disparity regardless of whether they are twenty feet away or a mile away. An approach in accordance with various embodiments can determine the distance between an object or feature and the device based on the amount of stereo disparity for the object between two images captured by the pair of cameras. For example, a user's face looking at a smart phone might typically be located within 50 centimeters from the device. By examining the disparity relationship curve 550 or relationship, the computing device, or an application or user of the device, can determine that the amount of disparity at fifty centimeters for the configuration parameters of the current device, e.g., camera resolution, camera separation, or field of view is twenty five pixels of separation between images. Using this information, the device can analyze matching feature points, e.g., nose, eyes, or fingertips, in the stereo images, and determine the approximate distance between those feature points and the computing device. For example, the amount of disparity, D, at a given distance, z, can be represented by the relationship.

$$D = \frac{f * B}{z} \quad \text{(Equation 1)}$$

where f is the focal length of each of the matched cameras and B is the baseline, or distance between the viewpoints of the cameras based at least in part upon their relative positions and separation. In this example, if the focal length of a camera is equivalent to four hundred pixels and the baseline is five centimeters, for a distance of one meter the disparity would be twenty pixels. Based on relationships such as this one, the computing device may be able to determine the distance between the object of interest and the device. Various other approaches can be utilized as well as should be apparent to one of ordinary skill in the art in light of the teachings and suggestions contained herein. For example, other approaches for determining a distance between an object of interest and the device can include using time-of-flight cameras or structured light cameras. A time-of-flight camera is a range imaging camera system that determines a distance of an object from the camera based on the known speed of light. For example, the camera can measure the time-of-flight of a light signal between the camera and the object for each point of an image of the object. A structured light camera is a three-dimensional scanning device used for measuring the three-dimensional shape of an object using projected light patterns and a camera.

Figure 6A:
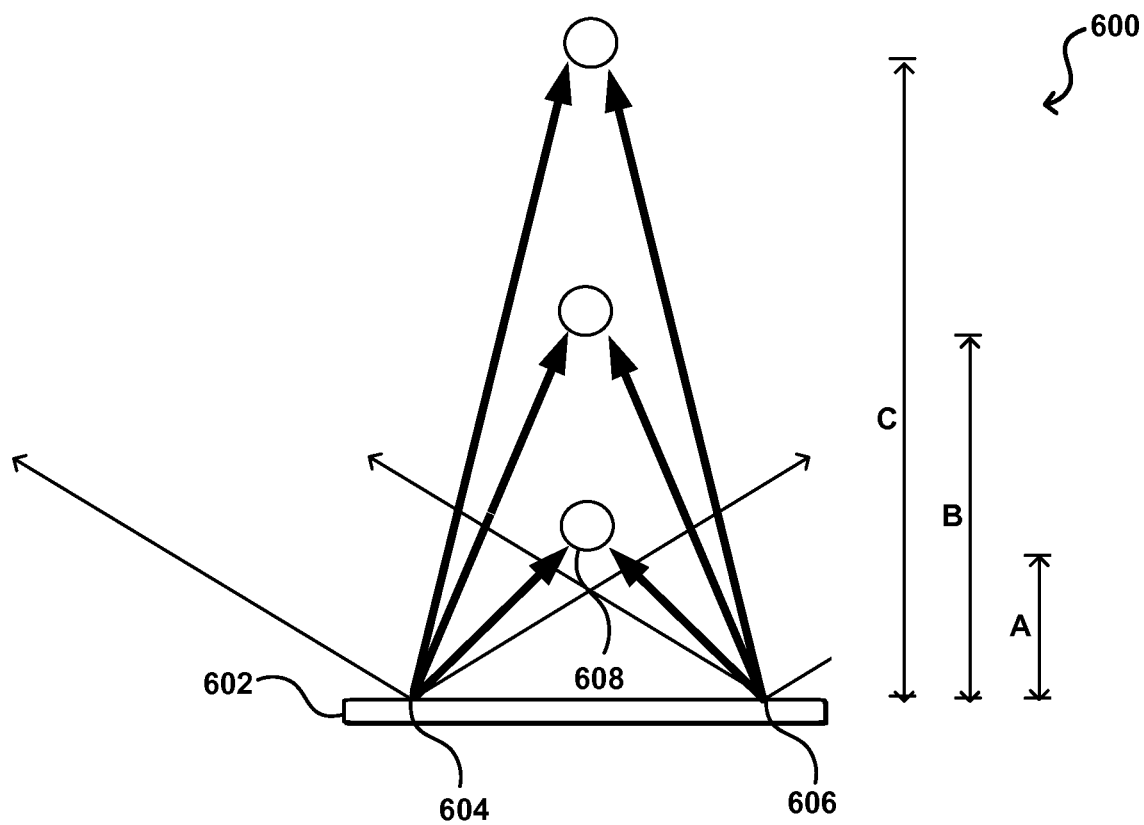
FIGS. 6A and 6B illustrate different disparities that can be determined for an object at different distances in accordance with various embodiments.
Figure 6B:
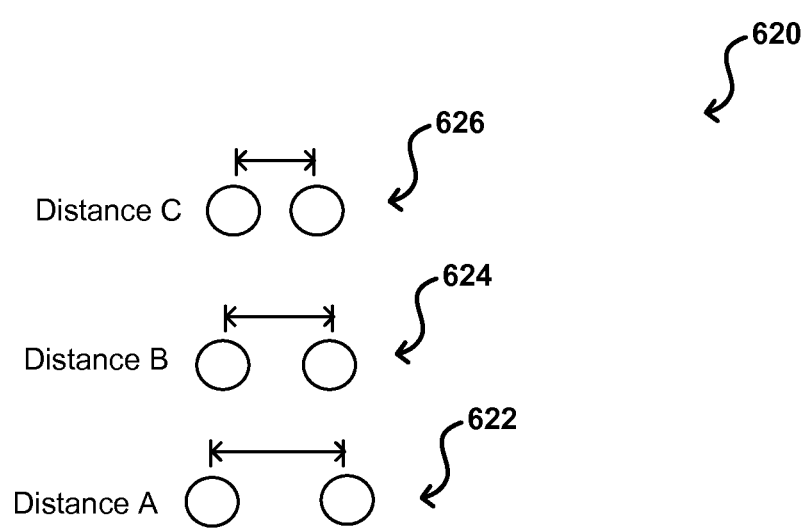

FIGS. 6A and 6B provide another illustration as to how disparity changes with distance. In the example 600 of FIG. 6A, an object 608 has image information captured by a pair of cameras 604, 606 of a computing device 602 at three different distances A, B, and C. Example rays from the center of each camera to the object are displayed at each distance. As can be seen, the rays approach horizontal (in the plane of the figure) as the object gets closer to the cameras, meaning that the object will appear closer to an edge of an image captured by either camera. Similarly, as the object 608 gets farther away, such as at position C, the rays get closer to vertical, or closer to parallel with each other, meaning that the object will appear closer to the center of each image, or closer to the same position in each image (for off-center objects). For objects that are sufficiently far away, those objects can appear in substantially the same location in each image. FIG. 6B illustrates example separations or disparities 622, 624, 626 that could be expected for each of distances A, B, and C, respectively, showing a decrease in offset with an increase in distance.

When the cameras are sufficiently aligned, such that the primary axes of the camera sensors (orthogonal to the primary plane of the respective sensor) are sufficiently parallel, or are corrected to appear sufficiently parallel via image transforms in the rectification operation, the disparity information can be used to determine the distance to an object. For example, the amount of disparity 624 for an object in stereoscopic image data can indicate that the object is at a distance of B if the cameras are sufficiently aligned. A problem arises, however, when the cameras become misaligned, or misaligned differently from when the rectification coefficients were last determined. For example, consider one of the cameras 606 in FIG. 6A. If that camera becomes misaligned such that the camera sensor is somewhat rotated with respect to what is shown in the figure, the ray to distance B, for example, will be at a different angle with respect to that angled camera sensor. This can cause the object 608 to appear at a slightly different location in the image captured by that camera 606, which then can change the amount of disparity for that object in the corresponding stereoscopic image data. Thus, any misalignment can create errors in disparity, which can result in improper determinations of distance based on those errors.

Figure 7:
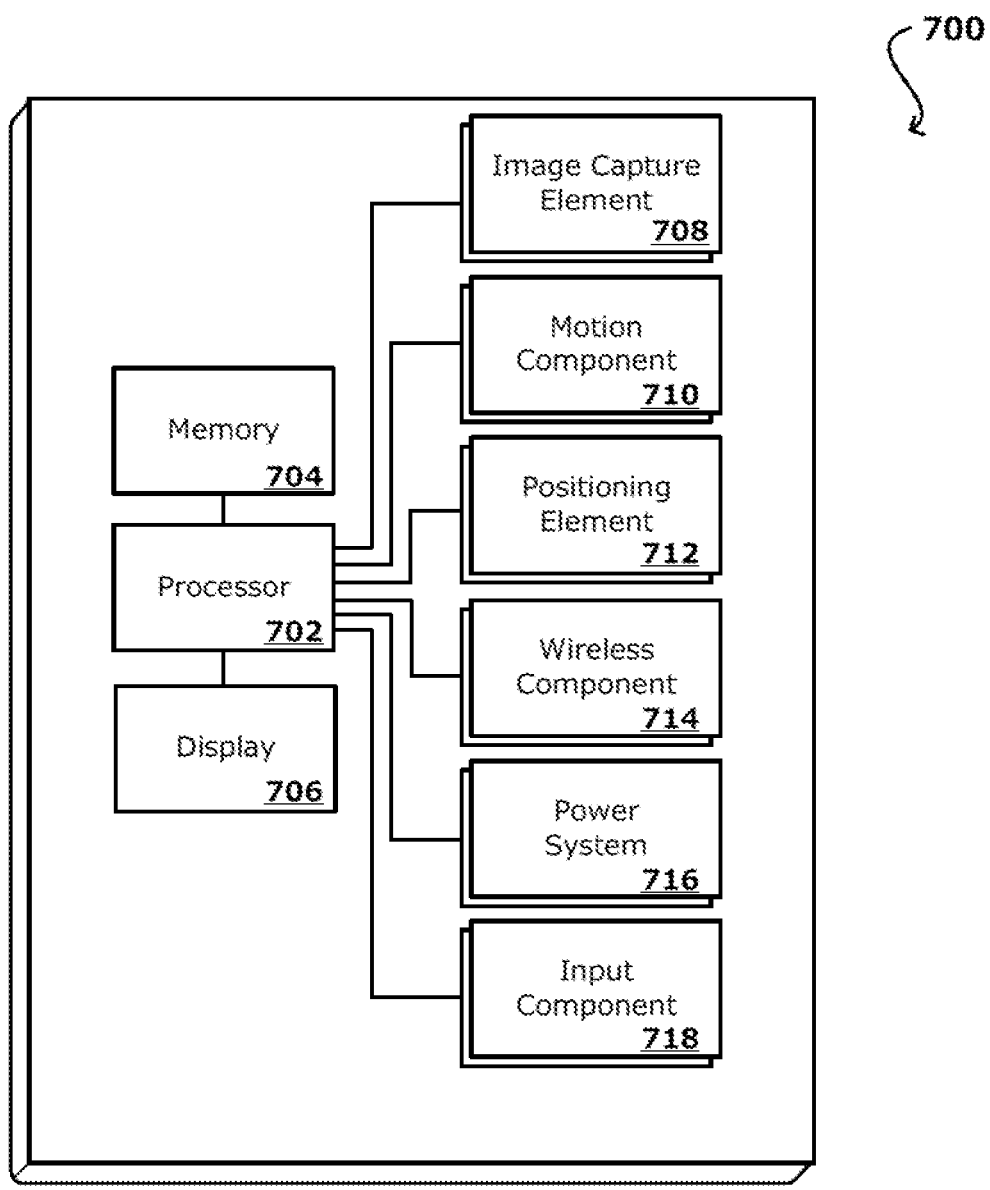
FIG. 7 illustrates an example set of basic components of a portable computing device, such as the device described with respect to FIG. 1.

FIG. 7 illustrates a set of basic components of an electronic computing device 700 such as the device 100 described with respect to FIG. 1. In this example, the device includes at least one processing unit 702 for executing instructions that can be stored in a memory component or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include at least one additional input component 718 able to receive conventional input from a user. This conventional input can include, for example, a push button, touch pad, touch screen, wheel, joystick, keyboard, mouse, keypad, or any other such component or element whereby a user can input a command to the device. These I/O components could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc.

A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
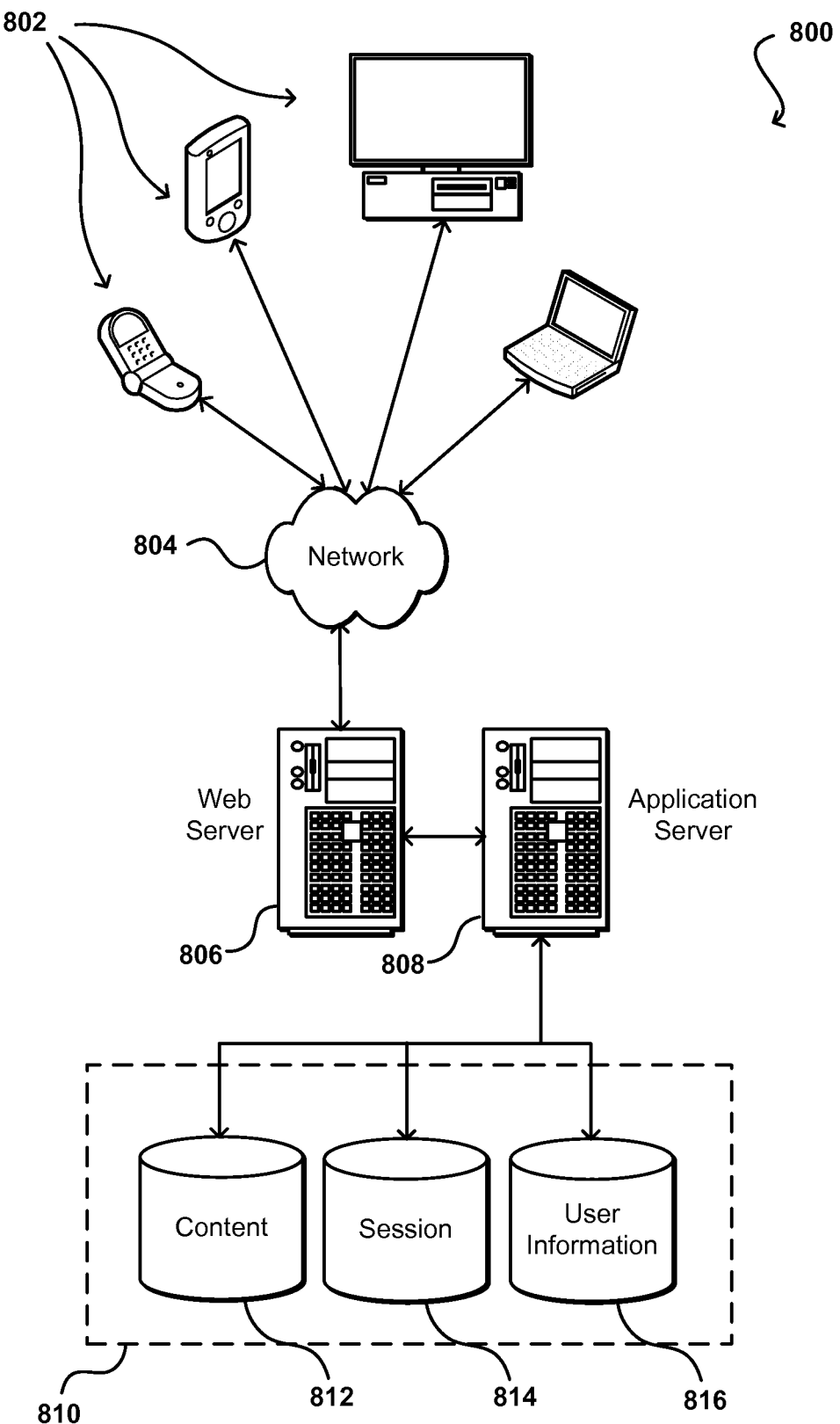
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes electronic client devices 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any component or combination of components capable of storing, accessing and retrieving data, which may include any combination and number of data servers, databases, data storage components and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client devices 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized components, each such component can include hardware elements that may be electrically coupled via a bus, the elements including, for example, at least one central processing unit (CPU), at least one input component (e.g., a mouse, keyboard, controller, touch-sensitive display element or keypad) and at least one output component (e.g., a display component, printer or speaker). Such a system may also include one or more storage components, such as disk drives, optical storage components and solid-state storage components such as random access memory (RAM) or read-only memory (ROM), as well as removable media components, memory cards, flash cards, etc.

Such devices can also include a computer-readable storage media reader, a communications component (e.g., a modem, a network card (wireless or wired), an infrared communication component) and working memory as described above. The computer-readable storage media reader can be connected with, or configured to receive, a computer-readable storage medium representing remote, local, fixed and/or removable storage components as well as storage media for temporarily and/or more permanently containing, storing, transmitting and retrieving computer-readable information. The system and various devices also typically will include a number of software applications, modules, services or other elements located within at least one working memory component, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage components or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
a first camera;
a second camera;
a third camera;
a fourth camera;
at least one processor; and
memory including instructions that, when executed by the at least one processor, causes the computing device to:
capture a first image of an object using the first camera;
capture a second image of the object using the second camera;
capture a third image of the object using the third camera;
capture a fourth image of the object using the fourth camera, wherein the first image, the second image, the third image, and the fourth image are captured at approximately a same time;
analyze an amount of disparity between a representation of the object in the first image and a representation of the object in the second image to determine a first distance between the computing device and the object, the amount of disparity corresponds to a difference in a location of the object as represented in the first image and a location of the object as represented in the second image, and wherein the difference in location is translated to the first apparent distance;
analyze an amount of disparity between the representation of the object in the second image and a representation of the object in the fourth image to determine a second distance between the computing device and the object;
analyze an amount of disparity between the representation of the object in the first image and a representation of the object in the third image to determine a third distance between the computing device and the object;
analyze an amount of disparity between the representation of the object in the third image and the representation of the object in the fourth image to determine a fourth distance between the computing device and the object;
determine a first difference between the first distance and the second distance is lower than a threshold distance;
determine a second difference between the third distance and the first distance is higher than the threshold distance;
determine a third difference between the fourth distance and the first distance is higher than the threshold distance;
determine the third camera is misaligned based on the first difference, the second distance, and the third difference;
determine an amount of misalignment along at least one direction for the third camera; and
update one or more calibration parameters for the third camera based on the amount of misalignment along the at least one direction.

2. The computing device of claim 1, wherein the instructions, when executed by the at least one processor, causes the computing device to:
determine a first amount of offset for at least one feature of the object in represented in the first image and the at least one feature of the object in represented in the third image along a y-axis;
determine a second amount of offset for at least one feature of the object represented in the third image and the at least one feature of the object in represented in the fourth image along an x-axis; and
determine at least one calibration parameter to correct for at least one of yaw, pitch, or roll misalignment for the third camera based at least in part on the first amount of offset and the second amount of offset.

3. The computing device of claim 1, wherein the first camera is aligned along a first axis with the second camera, wherein the third camera is aligned along a second axis with the fourth camera, wherein the first camera is aligned along a third axis with the third camera, the first axis being orthogonal to the third axis.

4. A computer implemented method, comprising:
acquiring respective images of at least one object using a first camera, a second camera, a third camera, and a fourth camera of a computing device, the respective images are acquired at approximately a same time and include a first image captured by the first camera, a second image captured by the second camera, a third image captured by the third camera, and a fourth image captured by the fourth camera;
determining a first distance of the at least one object from the computing device using the first image and the second image;
determining a second distance of the at least one object from the computing device using the second image and the fourth image;
determining a third distance of the at least one object from the computing device using the first image and the third image;
determining a fourth distance of the at least one object from the computing device using the third image and the fourth image;
determining the first distance corresponds to the second distance;
determining the third distance does not correspond to the first distance;
determining the fourth distance does not correspond to the first distance; and
determining the third camera is misaligned based on the first distance corresponding to the second distance, the third distance does not correspond to the first distance and the fourth distance does not correspond to the first distance.

5. The computer implemented method of claim 4, wherein determining the first distance of the at least one object further comprises:
analyzing an amount of disparity between a representation of the at least one object in the first image and a representation of the at least one object in the second image; and
wherein the amount of disparity relates to a difference in a location of the at least one object represented in the first image and a location of the at least one object represented in the second image.

6. The computer implemented method of claim 4, further comprising:
recalibrating the first camera, the second camera, the third camera, and the fourth camera based on an event.

7. The computer implemented method of claim 4, wherein the first camera and second camera are aligned along a first axis, wherein the third camera and the fourth camera are aligned along a second axis, wherein the first camera and third camera are aligned along a third axis, wherein the first axis is orthogonal to the third axis.

8. The computer implemented method of claim 4, further comprising:
updating at least one calibration parameter for the third camera, wherein the calibration parameter corresponds to at least one of a focal length, a principal point, or a lens distortion.

9. The computer implemented method of claim 8, wherein updating the at least one calibration parameter for the third camera further comprises:
determining, for the third camera, at least an amount of misalignment along at least one direction; and
updating the at least one calibration parameter for the third camera based at least in part on the amount of misalignment along the at least one direction.

10. The computer implemented method of claim 8, wherein updating the at least one calibration parameter for the third camera further comprises:
determining at least one amount of misalignment along at least one direction for the third camera;
determining the at least one amount of misalignment along the at least one direction exceeds a threshold amount that indicates the third camera is defective; and
configuring the computing device to stop using a defective camera.

11. The computer implemented method of claim 10, further comprising:
presenting a graphical indicator on a display screen of the computing device, the graphical indicator indicates the third camera is defective.

12. The computer implemented method of claim 8, wherein updating the at least one calibration parameter for the third camera further comprises:
determining a number of times the least one calibration parameter for the third camera is updated within a time interval; and
identifying the third camera as defective based on the number of times exceeding a threshold number for the time interval; and configuring the computing device is configured to stop using a defective camera.

\* \* \* \* \*